UNITED STATES PATENT OFFICE 2,683,760

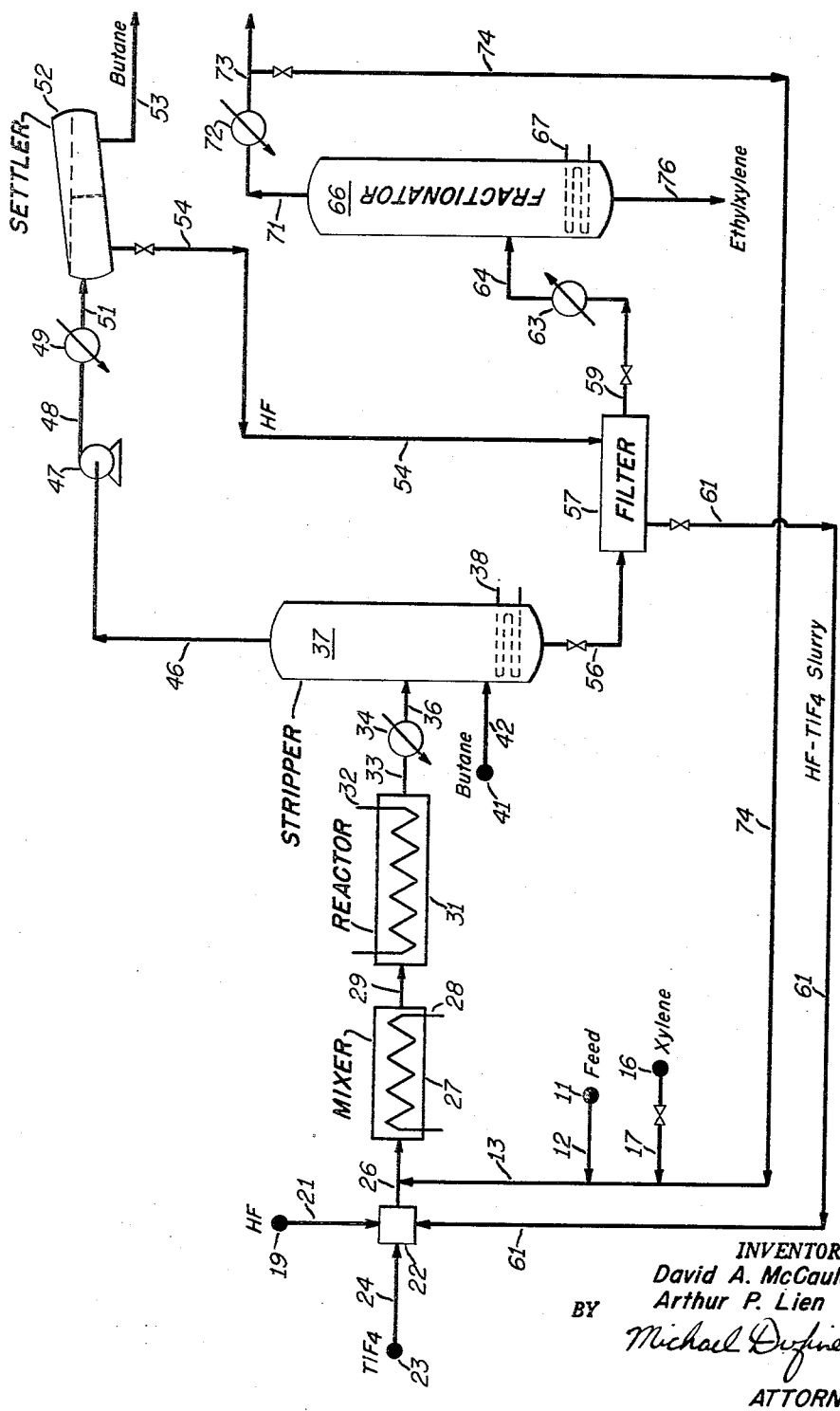

MANUFACTURE OF 1,3,5-ETHYLXYLENE

David A. McCaulay, Chicago, Ill., and Arthur P. Lien, Highland, Ind., assignors to Standard Oil Company, Chicago, Ill., a corporation of Indiana Application March 22, 1952, Serial No. 277,966

5 Claims. (Cl. 260—671)

This invention relates to the manufacture of ethylxylenes by the reaction of xylene and ethylbenzene. More particularly, the invention relates to the preparation of symmetrical 1,3,5-ethylxylene. Still more particularly, the invention relates to the preparation of a high purity 1,3,5-ethylxylene.

The commercial polystyrene resins have the disability of a softening point lower than the boiling point of water. It is known that resins prepared from dimethylstyrene have a softening point higher than the boiling point of water. Ethylxylenes with an ortho arrangement of a methyl and the ethyl group dehydrogenate to methylindenes, which are very difficult to separate from the dimethylstyrene. The methylindenes act as plasticizers and lower the softening point of the polydimethylstyrene, the presence of about 6% of these contaminants in the resin lowers the softening point below the boiling point of water. In the prior art processes, the ethylxylenes having the undesirable ortho relation between a methyl and the alkyl group are the predominant product.

It is an object of this invention to prepare ethylxylene by the reaction of xylene and ethylbenzene under controlled conditions. Another object is the preparation of 1,3,5-ethylxylene of high purity. Still another object is the manufacture of 1,3,5-ethylxylene in high purity and in good yield by the reaction of xylene and ethylbenzene under controlled conditions and in the presence of a treating agent consisting of liquid HF and $TiF_4$.

We have previously discovered that polyalkylbenzenes, such as, xylene, diethylbenzene, ethylxylene react with liquid HF and titanium tetrafluoride to form a complex containing 2 mols of $TiF_4$ and probably 1 mol of HF for each mol of polyalkylbenzene. It is believed that HF is present in the complex because no complex is formed between $TiF_4$ and xylene in the absence of liquid HF. Under the conditions of this process benzene, toluene and ethylbenzene do not form a complex with $TiF_4$ and liquid HF. The complex is extremely soluble in liquid HF and sufficient liquid HF must be present in the reaction zone to form the complex and also to dissolve the complex itself.

The liquid HF used in the process should be substantially anhydrous, i. e., the liquid HF should not contain more than about 1 to 2% of water. The amount of liquid HF needed in the process is between at least about 2 mols and about 50 mols per mol of xylene present in the feed. Put in another way, the amount of liquid HF used should be between about 20 and 1,000 volume percent, based on xylene. Preferably, the liquid HF should be between about 100 and 500 volume percent.

$TiF_4$ is a crystalline solid having a boiling point of 543° F. The solid is only slightly soluble in liquid HF. The solubility of $TiF_4$ in liquid HF is enormously increased when a polyalkyl aromatic hydrocarbon is brought into contact with the $TiF_4$ in the presence of liquid HF. Thus a slurry of $TiF_4$ and liquid HF is quickly converted to a clear, reddish liquid when the slurry is contacted with a sufficient amount of xylene.

Benzene and ethylbenzene are soluble in liquid HF to the extent of 3 or 4 volume percent at ambient temperatures. The presence of a $TiF_4$-HF-xylene complex in the liquid HF markedly increases the solubility of benzene and ethylbenzene in the liquid HF. Apparently the complex acts as a solubility promoter for non-complexible aromatic hydrocarbons. The ability of liquid HF to dissolve benzene and ethylbenzene increases with increase in the amount of complex present in the liquid HF. The ability of liquid HF to take up ethylbenzene is very markedly increased by the conversion of ethylbenzene to diethylbenzene. Liquid HF and $TiF_4$ rapidly disproportionate ethylbenzene to diethylbenzene; the diethylbenzene complexes with $TiF_4$ and HF and passes into solution in the form of a complex.

In addition to the formation of diethylbenzene, the disproportionation of ethylbenzene results in the formation of some triethylbenzene. It has been found that the presence of a $TiF_4$-HF-xylene complex in the liquid HF tends to suppress the formation of triethylbenzene. Nearly complete disproportionation of the ethylbenzene to diethylbenzene can be obtained by using enough $TiF_4$ to complex all the xylene present and all the diethylbenzene formed in the reaction. It has been discovered that the diethylbenzene-complex and the xylene-complex will slowly react to form ethylxylenes (which are complexed) ethylbenzene and benzene. Furthermore, it has been discovered that the ethylxylene reaction product is predominantly a symmetrical 1,3,5-ethylxylene; and by controlling the conditions of the reaction, it is possible to limit the ethylxylene produced to the desired 1,3,5-ethylxylene isomer exclusively.

The amount of $TiF_4$ needed in the process is at least that amount which will bring into the liquid HF phase all of the xylene and ethylbenzene charged to the reaction zone. When the mol ratio of xylene to ethylbenzene in the feed is at least 1, the minimum amount of $TiF_4$ should be about 1.4 mols per mol of xylene in the feed. More than the minimum amount of $TiF_4$ may be used; however, it is preferred to limit the amount of $TiF_4$ present to that amount which will be in the liquid HF phase either in the form of a complex or in physical solution. The presence of undissolved $TiF_4$ in the reaction zone results in the formation of undesired side reaction products.

Although the process works satisfactorily for the production of ethylxylenes when more than the amount of $TiF_4$ needed to complex all the xylenes charged is present in the reaction zone, it is preferred to use less than this amount, i. e., less than 2 mols of $TiF_4$ per mol of xylene charged. When using at least 2 mols of TiF₄ per mol of xylene, the time for attaining a reaction product in which ethylxylene is the predominant product is increased somewhat over the process using less than 2 mols of TiF₄. Hereinafter, mols of TiF₄ is intended to mean mols of TiF₄ per mol of xylene charged to the reaction zone. It is preferred to limit the amount of TiF₄ in the reaction zone to the amount which will solubilize all the xylene and ethylbenzene into the liquid HF phase. In general, it is preferred to use between about 1.4 and 1.9 mols of TiF₄. The presence of dissolved non-complexed xylene not only speeds up the ethylxylene reaction, but also appears to reduce the amount of diethylbenzene present in the reaction products. By the use of a system consisting essentially of xylene-complex, free-xylene, ethylbenzene and liquid HF, it is possible to produce a reaction product wherein the $C_{10}$ aromatic hydrocarbon product contains in excess of 95% of 1,3,5-ethylxylene, i. e., high purity material.

In general, the xylene to ethylbenzene molal ratio must be at least 1 in order to obtain appreciable yields of ethylxylene. Higher ratios aid in reducing the amount of diethylbenzene present in the reaction product. In general, the preferred minimum xylene/ethylbenzene ratio is about 1.5; the xylene/ethylbenzene ratio may be as great as 10 or more. It is preferred to operate at a xylene/ethylbenzene ratio between about 2.5 and 5.

Although the mechanism of this process is not fully understood, it is believed that the ethyl group adds to the xylene and several, if not all, of the isometric ethylxylenes are formed. After the ethyl group addition, isomerization takes place. Hereby the ethylxylene isomers are converted to the symmetrical 1,3,5-ethylxylene configuration. Apparently this configuration forms the most stable complex with HF and TiF₄.

It has been found that the distribution of ethylxylene isomers in the reaction product is dependent upon both temperature and reaction time. The reaction temperature that may be used is limited by the fact that at higher temperatures the unreacted xylenes disproportionate to form polymethylbenzenes, toluene and benzene. The tendency of the ethylxylenes to crack and form tarry materials imposes an upper limit of about 160° F. on the reaction temperature. It has been found that xylenes disproportionate in appreciable amounts when held at temperatures in excess of 100° F. for several hours; for example, when a single phase homogeneous system of meta-xylene, TiF₄ and HF was held at 86° F. for 24 hours, about 2% of the meta-xylene was disproportionated into toluene and trimethylbenzene. In order to avoid the loss of xylene and ethylxylenes, the reaction temperature should be maintained at the lowest point consistent with satisfactory reaction times and with conversion to the desired 1,3,5-ethylxylene form. Lowering the temperature of the reaction decreases the rate of reaction and of the isomerization of the ethylxylenes. However, temperatures as low as 0° F. or lower can be used if the correspondingly longer reaction time is used. In the operable temperature range, the amount of ethylbenzene reacted reaches a maximum of about 90%. At 160° F., the maximum conversion is reached in about 15 minutes. At 45° F., the reaction time for maximum conversion may be in excess of 50 hours. It is preferred to operate between about 120° F. and 140° F. at reaction times between about 30 minutes and 2 hours; the longer times correspond to the lower temperatures.

The xylenes charged to this process can be any one of the three isomers or any mixture thereof. The most desirable xylene is the meta-isomer. Meta-xylene reacts with ethylbenzene to form 1,3,5-ethylxylene to the virtual exclusion of the other ethylxylene isomers. When using para-xylene, ortho-xylene, mixtures thereof, or mixtures of these and meta-xylene, it may be necessary to extend the reaction time beyond that needed to complete the xylene-ethylbenzene reaction, in order to isomerize the ethylxylene mixture and obtain 1,3,5-ethylxylene of high purity. Para-xylene and ortho-xylene disproportionate much more readily than meta-xylene. In general, lower temperatures should be used when either or both of these isomers are present in the charge to the reaction. About 140° F. is the upper temperature limit and a suitable operating temperature is about 120° F.

The following runs illustrate the experimental procedure used and the results obtainable by this process. The runs were carried out in a 1570 ml. carbon steel autoclave fitted with a 1725 R. P. M. stirrer. The desired amounts of TiF₄, xylene, ethylbenzene and liquid HF were added to the reactor. The temperature of the reactor contents was maintained at a selected temperature for a selected reaction time. The contents of the reactor were withdrawn into a Dry-Ice cooled flask containing crushed ice. In each run insofar as could be determined by visual observation, only a liquid HF phase and some undissolved TiF₄ was present in the reactor.

The flask containing the reaction products was allowed to warm to room temperature. The supernatant hydrocarbons—displaced from their TiF₄-HF complexes by the water—were separated from the aqueous acid phase. The hydrocarbons were washed with dilute aqueous caustic to remove traces of HF. The reaction products were fractionated to a number of close boiling cuts by means of a 30 theoretical plate column. Each cut was analyzed by ultraviolet absorption or infrared absorption, together with refractive index and specific gravity measurements. The properties of the high purity ethylxylene product were compared with those given by Birch et al. in Petroleum Preprints, A. C. S. Spring 1948, p. 135. The data for runs 1, 2 and 3 are presented below.

| Run No. | 1 | | 2 | | 3 | |
|---|---|---|---|---|---|---|
| Temperature, °F | 64 | | 46 | | 130 | |
| Contact Time, Minutes | 30 | | 48 hrs. | | 30 | |
| | ml. | mols | ml. | mols | ml. | mols |
| Reactor Charge: | | | | | | |
| m-xylene | 100 | 0.8 | 100 | 0.8 | 100 | 0.8 |
| Ethylbenzene | 100 | 0.8 | 100 | 0.8 | 100 | 0.8 |
| HF | 500 | 25 | 500 | 25 | 500 | 25 |
| TiF₄ | 388 g. | 3.2 | 388 g. | 3.2 | 388 g. | 3.2 |
| Hydrocarbon Recovery, wt. percent | 90 | | 82 | | 85 | |
| Production Distribution, mol percent: | | | | | | |
| Benzene | 20.7 | | 31.2 | | 32.6 | |
| m-xylene | 49.6 | | 26.0 | | 12.3 | |
| Ethylbenzene | 10.1 | | 3.2 | | 3.4 | |
| 1,3-diethylbenzene | 14.5 | | 7.1 | | 4.8 | |
| 1,3,5-ethylxylene | 1.3 | | 26.0 | | 40.8 | |
| $C_{12}$ aromatics | 3.8 | | 6.5 | | 6.1 | |
| Ethylbenzene conversion, percent | 80 | | 93 | | 93 | |
| Xylene to ethylxylene, percent | 2 | | 50 | | 75 | |

The accompanying drawing shows one embodiment of this process for the production of high purity 1,3,5-ethylxylene by the reaction of xylenes and ethylbenzene. It is to be understood that this embodiment is shown for purposes of illustration only and that many other variations can be readily devised by those skilled in the art. It is to be further understood that pumps, numerous valves and other pieces of process equipment have been omitted because these can be readily supplied to the embodiment by those skilled in the art.

In this illustration the charge consists of a mixture of m-xylene, p-xylene and ethylbenzene. The charge was derived from the product of the hydroforming of a virgin naphtha. The "xylene cut" which contained about 21% o-xylene was fractionated in order to separate the o-xylene. The remainder consists of: ethylbenzene, 15%; m-xylene, 61%; and p-xylene, 24%.

The charge from source 11 is passed through line 12 into line 13. In the case where the feed contains a high percentage of ethylbenzene, xylenes can be added from source 16 by way of valved line 17 into line 13 to increase the xylene to ethylbenzene ratio.

Liquid HF from source 19 is passed by way of line 21 into vessel 22, which vessel 22 is provided with agitating means not shown. Finely divided $TiF_4$ from source 23 is passed by way of line 24 into vessel 22. Many methods are known for introducing a finely divided solid into a line and for conveying the material into a closed vessel, e. g., storage 23 may be equipped with a star valve at the exit thereof and line 24 may be equipped with conveying flights for moving the solid. In vessel 22 the liquid HF and the $TiF_4$ form a slurry, as in this case more $TiF_4$ is used than is soluble in the liquid HF. This slurry is passed from vessel 22 into line 26 where it meets the feed from line 13.

Another method of introducing $TiF_4$ into the system is to add $TiCl_4$—a liquid—into vessel 22 where the chloride reacts with HF to produce $TiF_4$. Additional liquid HF must be added to vessel 22 to participate in the reaction and to leave the desired amount of liquid HF for use in the reaction zone. When adding $TiCl_4$, means for venting HCl should be provided on vessel 22.

In this illustration we use 300 volume percent of liquid HF based on xylene in the feed and 1.8 mols of $TiF_4$ per mol of xylene present in the feed. The contents of line 26 are passed into mixer 27, which mixer is provided with a heat exchange coil 28. The reaction of the HF, $TiF_4$ and xylene to form the complex is exothermic and the heat exchange coil 28 is provided to enable the temperature of the reaction mixture to be controlled. In mixer 27 the liquid HF, $TiF_4$ and feed are agitated and form a single homogeneous liquid phase consisting essentially of liquid HF, complexed-xylene, free-xylene and ethylbenzene.

The reaction mixture is passed from mixer 27 by way of line 29 into reactor 31. Reactor 31 is provided with a heat exchange coil 32. In this example the reaction is carried out at a temperature of about 130° F. The reaction mixture is held in reactor 31 for a time sufficient to obtain the desired degree of conversion of the ethylbenzene and to substantially complete the isomerization of ethylxylenes to the desired 1,3,5-ethylxylene isomer. At the operating conditions used in this illustration a suitable reaction time is about 60 minutes.

The contents of reactor 31 are passed through line 33, heat exchanger 34 and line 36 into stripper 37 which is provided with internal heater 38. The contents of reactor 31 may be cooled quickly in exchanger 34 in order to decrease the degree of disproportionation of the xylene which takes place readily at this elevated temperature. In stripper 37 the complex is decomposed by removing the HF. In order to avoid the formation of undesirable by-products through disproportionation and cracking, the removal of the HF is carried out under vacuum. The HF removal operation is facilitated by the use of a stripping agent. Here butane from source 41 is passed by way of line 42 into stripper 37 near the bottom thereof. The stripping agent should be substantially inert to the catalytic action of HF.

The HF and butane vapors pass out of stripper 37 through line 46, vacuum pump 47, line 48 into cooler 49. In cooler 49 the HF and butane are condensed and the liquid is passed by way of line 51 into settler 52. The upper layer of butane is separated from the lower layer of HF in settler 52 and is recycled to line 42 by way of line 53 and other lines not shown. The lower HF layer is withdrawn from settler 52 by way of valved line 54.

In the bottom of stripper 37 there appears upon the removal of the HF a slurry of extremely finely divided $TiF_4$ in the hydrocarbon reaction products. The particle size of the $TiF_4$ varies somewhat with the operation of stripper 37 and may in some cases be almost colloidal in nature. The slurry of $TiF_4$ and hydrocarbons is withdrawn from stripper 37 by way of valved line 56 and is passed into filter 57. Filter 57 may be any type of HF-resistant and HF-vapor tight filter which is adapted to the removal of extremely finely divided solids. Instead of a filter a centrifugal separator may be used. The $TiF_4$ is retained in filter 57 and the hydrocarbons are passed into valved line 59. It is to be understood that even though only one filter is shown, for continuous operation two or more filters would be used.

The $TiF_4$ is removed from filter 57 by means of a backwashing operation with liquid HF from line 54. The slurry of liquid HF and $TiF_4$ is passed from filter 57 by way of valved line 61 to vessel 22 for reuse in the process.

The hydrocarbons pass out of filter 57 through line 59 through heater 63 and line 64 into fractionator 66, which is provided with reboiler 67. The unreacted xylene and ethylbenzene pass overhead through line 71 and are condensed in cooler 72. This fraction may be sent to storage by way of line 73 or may be recycled to line 13 by way of valved line 74. In this illustration only a very small percentage of $C_{12}$ aromatic hydrocarbons is formed in the reaction. In addition to the $C_{12}$ aromatics, a very slight amount of diethylbenzene is also formed. The diethylbenzene and $C_{12}$ aromatic hydrocarbons form less than about 5% of the total reaction products. Thus a high purity 1,3,5-ethylxylene fraction is withdrawn from the bottom of fractionator 54 through line 76 and is sent to storage not shown. If desired, the slight amount of $C_{12}$ aromatic hydrocarbons may be removed by distillation from the reaction product in order to obtain a still higher purity ethylxylene product.

Although a filter technique has been shown for the separation of $TiF_4$ from the reaction product other methods may be utilized, e. g., the slurry of $TiF_4$ and reaction products may be passed from stripper 37 through a heat exchanger and passed into a flash chamber where the hydrocarbons are taken overhead, leaving TiF$_4$ behind. The TiF$_4$ may then be removed from the flash chamber by slurrying with HF. This flashing technique may be made continuous by using two flash chambers operating alternately. Other methods of making this separation can be readily devised by those skilled in the art.

This application is a continuation-in-part of our copending application Serial No. 272,654, filed February 20, 1952, and entitled "Xylene Separation With Liquid HF and TiF$_4$."

Having described the invention, what is claimed is:

1. A method for the preparation of high purity 1,3,5-ethylxylene by the reaction of xylene and ethylbenzene, which method comprises the steps of contacting xylene and ethylbenzene in an amount between about 1.5 and 10 mols of xylene per mol of ethylbenzene, with liquid HF in an amount between about 20 and 1,000 volume percent per volume of said xylene, and with between about 1.4 and 1.9 mols of TiF$_4$ per mol of said xylene, maintaining said materials at a temperature between about 45° and 160° F. for a time between about 15 minutes and 50 hours, in such manner that the longer time corresponds to the lower temperature, removing HF and TiF$_4$ from the hydrocarbons and separating high purity 1,3,5-ethylxylene from said hydrocarbons.

2. The process of claim 1 wherein the mol ratio of xylene to ethylbenzene is between about 2.5 and 5.

3. The process of claim 1 wherein the amount of liquid HF is between about 100 and 500 volume percent, based on xylene.

4. The method of claim 1 wherein said xylene is meta-xylene.

5. The method of claim 1 wherein said xylene is a mixture of at least two isomeric xylenes.

References Cited in the file of this patent

UNITED STATES PATENTS

| Number | Name | Date |
|---|---|---|
| 2,385,524 | Mattox | Sept. 25, 1945 |
| 2,514,866 | Hovey | July 11, 1950 |
| 2,564,073 | Lien et al. | Aug. 14, 1951 |